(12) United States Patent
Mawatari et al.

(10) Patent No.: US 7,422,640 B2
(45) Date of Patent: Sep. 9, 2008

(54) METHOD OF REMOVING TACKY SUBSTANCE OR WASTE LIQUID CONTAINING TACKY SUBSTANCE

(75) Inventors: Tomohiko Mawatari, Hiroshima (JP); Miezi Sugiyama, Hiroshima (JP); Yoshiyuki Taniguchi, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 379 days.

(21) Appl. No.: 10/541,629

(22) PCT Filed: Dec. 22, 2003

(86) PCT No.: PCT/JP03/16445

§ 371 (c)(1), (2), (4) Date: Jul. 7, 2005

(87) PCT Pub. No.: WO2004/062771

PCT Pub. Date: Jul. 29, 2004

(65) Prior Publication Data

US 2006/0144422 A1   Jul. 6, 2006

(30) Foreign Application Priority Data

Jan. 9, 2003   (JP) .............................. 2003-003151

(51) Int. Cl.
*B08B 7/00* (2006.01)
(52) U.S. Cl. .............................. 134/6; 134/7; 134/22.1; 134/22.11; 134/42
(58) Field of Classification Search ..................... 134/6, 134/7, 22.1, 22.11, 42
See application file for complete search history.

(56) References Cited

U.S. PATENT DOCUMENTS

| 3,631,163 | A | * | 12/1971 | Witt | .............................. 526/71 |
|---|---|---|---|---|---|
| 3,788,984 | A | * | 1/1974 | Teng | ........................... 210/671 |
| 4,038,473 | A | * | 7/1977 | Cohen | ........................... 526/62 |
| 4,959,154 | A | * | 9/1990 | Simmons | ..................... 210/680 |
| 5,135,578 | A | * | 8/1992 | Billings | ......................... 134/7 |
| 2002/0162514 | A1 | * | 11/2002 | Billi et al. | .................... 119/166 |
| 2004/0026228 | A1 | * | 2/2004 | Diehl et al. | .................... 203/96 |
| 2006/0144422 | A1 | * | 7/2006 | Mawatari et al. | ................ 134/6 |

FOREIGN PATENT DOCUMENTS

JP   6-15117   1/1994
JP   7-214071   8/1995

* cited by examiner

*Primary Examiner*—Sharidan Carrillo
(74) *Attorney, Agent, or Firm*—Oblon, Spivak, McClelland, Maier & Neustadt, P.C.

(57) ABSTRACT

A method of removing a sticky substance or a waste liquid containing a sticky substance which comprises, mixing a solid substance having inflammability and liquid-absorptivity into the sticky substance or the waste liquid containing the sticky substance wherein these are mixed to allow a liquid component of the sticky substance or the waste liquid containing the sticky substance to be absorbed into the solid substance and to allow the sticky substance to be entangled with the solid substance, and then removing the sticky substance together with the solid substance.

11 Claims, No Drawings

METHOD OF REMOVING TACKY SUBSTANCE OR WASTE LIQUID CONTAINING TACKY SUBSTANCE

TECHNICAL FIELD

The present invention relates to a method of easily removing, for example, waste liquid containing a sticky substance by-produced in a reaction process of petrochemical process, liquid (waste liquid) containing a partially polymerized substance (sticky substance) generated in a process of production and storage of an easily-polymerizable substance.

BACKGROUND ART

A sticky substance is by-produced in a reaction process of petrochemical process, and waste liquid containing the sticky substance is extremely difficult to be removed due to its stickiness. Usually, the sticky substance is removed by methods such as dissolving by a solvent. In a process of producing and storing an easily-polymerizable substance, a partially polymerized substance is generated. The process liquid containing the partially polymerized substance (sticky substance) is also removed as waste liquid, usually, by methods such as dissolving by a solvent (see, Japanese Patent Application Laid-Open (JP-A) No. 2000-290225). If the stickiness is lower to a certain extent, the waste liquid is fed as it is to an incinerator by a pump without using a solvent, and then it is burned. The steam is recovered from waste liquid, thus, waste liquid can be treated economically and efficiently in some cases.

However, if the stickiness is higher to a certain extent, a larger amount of solvent is generally necessary as compared with the amount of waste liquid. Therefore, cost required for a solvent itself, and deterioration in working environments because of harmfulness and volatility of the solvent, are often problematical. It is apparent that recovering a large amount of solvent after dissolution and burning this gives energy waste. Particularly, process liquid containing a polymerized substance generated in an equipment for producing methyl (meth)acrylate and (meth)acrylic acid contains by-products having high stickiness and showing solid-like nature in some cases. Among them, there are not a few substances poorly-soluble in a solvent. Such process liquid is impossible to be lifted by a pump in some cases.

In the specification of the instant application, (meth)acrylic acid is generic name for acrylic acid and methacrylic acid. Methyl (meth)acrylate is generic name for methyl acrylate and methyl methacrylate.

Removal of liquid containing such a sticky substance from a vessel is disadvantage from the standpoints of cost, working environment or energy saving in conventional methods using a solvent, and complete removal thereof is difficult.

DISCLOSURE OF INVENTION

An object of the present invention is, in the case of removal of a sticky substance or waste liquid containing a sticky substance from a vessel and the like which has been conventionally difficult, to provide a method which makes the removal work easy and can perform also the subsequent burning treatment at low cost and easily.

The present invention provides a method of removing a sticky substance or a waste liquid containing a sticky substance which comprises mixing a solid substance having inflammability and liquid-absorptivity into the sticky substance or the waste liquid containing the sticky substance wherein these are mixed to allow a liquid component of the sticky substance or the waste liquid containing the sticky substance to be absorbed into the solid substance and to allow the sticky substance to be entangled with the solid substance, and then removing the sticky substance together with the solid substance.

In the present invention, since a liquid component is absorbed into and a sticky substance is entangle with such a solid substance, the resulted mixture can be handled as if it is solid. For example, it can be efficiently and almost completely removed from a vessel by a scoop, and then it can be easily packed. Furthermore, the sticky substance entangled with the solid substance after removal from a vessel can be, for example, put into an incinerator and burnt completely. Therefore, the present invention is by far advantageous as compared with cases using noncombustibles such as sand and advantageous from the standpoints of working environments and energy saving as compared with a case using a solvent.

BEST MODE FOR CARRYING OUT THE INVENTION

In the present invention, a solid substance having inflammability and liquid-absorptivity is used in order to remove a sticky substance or waste liquid containing a sticky substance from a vessel and the like in maintenance or cleaning of various production equipments and storage equipments.

Here, the sticky substance or waste liquid containing a sticky substance includes not only a sticky substance or waste liquid containing a sticky substance by-produced in a reaction process of petrochemical process, but also, for example, a partially polymerized substance or process liquid containing a partially polymerized substance generated in a process of production, distillation, purification or storage of a easily-polymerizable substance. The method of the present invention is very useful particularly in the case of removal as waste liquid of a partially polymerized substance or process liquid containing a partially polymerized substance discharged from an equipment for producing methyl (meth)acrylate and/or (meth)acrylic acid.

The solid substance having inflammability and liquid-absorptivity is not particularly restricted, and it is preferable to use substances of which raw material is cheap and which give no harmfulness, can be obtained easily and can be present on a routine basis. The shape thereof may be particle, flake, fiber, powder, chip, string, thread, noodle and the like. Specifically, a fractured substance made of wood (e.g., sawdust) is preferable since it is cheap and obtainable easily and has no harmfulness. In addition to the fractured substance made of wood, for example, a cut substance made of paper (e.g., shredder dust) can be used as a solid substance having inflammability and liquid-absorptivity.

In maintenance or cleaning of a vessel storing waste liquid, for example, first, liquid having stickiness relatively lower so that it can be discharged from a vessel under head pressure is discharged from a discharging port and received by another vessel. A solid substance having inflammability and liquid-absorptivity is added to this liquid having lower stickiness discharged into another vessel. These are mixed by a scoop, stirring rod, stirrer or the like. By mixing, the solid substance absorbs a liquid component, and the sticky substance is entangled with the solid substance, to lower stickiness and to give handling like solid. The sticky substance provided with handling like solid may be advantageously packed by, for example, a scoop.

The vessel for storing waste liquid after removal of liquid having relatively lower stickiness usually contains liquid having relatively higher stickiness left. Regarding the residue remaining at the bottom of such a vessel, for example, it is advantageous that a solid substance having inflammability and liquid-absorptivity is dispersed in the vessel, mixed by a scoop, and packed to be discharged out of the vessel in the same manner.

Then, the packed waste liquid removed out of the vessel can be burnt as it is. A sticky substance remaining in the vessel in slight amount can be easily wiped away by a waste cloth.

In the present invention, the amount of a solid substance having inflammability and liquid-absorptivity is not particularly restricted, and the amount may be such that a liquid component is absorbed sufficiently so as to give handling like solid and stickiness can be lowered.

The present invention will be illustrated further in detail by examples below, but they are only exemplary and dot not limit the scope of the invention at all.

EXAMPLE

As described bellow, the cleaning was performed of a tank for storing waste liquid of a process of continuously synthesizing methyl methacrylate and methacrylic acid, wherein acetonecyanhydrin reacted with sulfuric acid to produce methacrylamide sulfate and then it reacted with water and methanol.

First, most of the residue in tank was discharged, and the residual liquid containing a sticky polymerized substance mainly composed of methacrylic acid was leaved in tank. The discharged liquid containing a polymerized substance which had stickiness so lower as to be discharged from the tank discharging port under head pressure was received by a basin. Then, a fractured substance made of wood (i.e., sawdust) was dispersed on the discharged liquid in the basin, and they were mixed by a scoop. When the fracture substance made of wood absorbed a liquid component and the sticky polymerized substance mainly composed of methacrylic acid was entangled with the fracture substance made of wood and resultantly the mixture got easy handling by a scoop approximately like solid, the mixture was packed in a plastic bag. Thus, the waste liquid discharged from the discharging port could be completely packed.

On the other hand, a polymerized substance mainly composed of methacrylic acid having stickiness so high as to give poor discharging from the tank discharging port remained at the bottom of the tank. Here, a fractured substance made of wood (i.e., sawdust) was dispersed in the tank and mixed by a scoop, and then packed in the same manner to be removed outside. The sticky polymerized substance packed did not leak as liquid even if a pore is made on the bag.

Furthermore, a slight amount of sticky polymerized substance adhere on the bottom and wall surface of the tank was wiped away by waste cloth to perform a cleaning approximately completely the inside of the tank. Then, the packed sticky polymerized substance removed out of the tank and the waste liquid containing the polymerized substance were charged into an incinerator capable of burning solid, and all of them could be burnt.

In the above-mentioned packing operation, the polymerized substance adhered to a rubber glove to cause pollution. However, when the fractured substance made of wood (i.e., sawdust) was grasped once and both hands were rubbed mutually, the polymerized substance was entangled with the fractured substance made of wood and consequently the glove could be cleaned easily.

The fractured substance made of wood (i.e., sawdust) used in this example was purchased from a lumber mill at low cost and had a size generally available.

COMPARATIVE EXAMPLE

The same cleaning in the tank as in Example was performed without using a solid substance having inflammability and liquid-absorptivity.

First, most of waste liquid was discharged in the same manner as in Example. Here, liquid containing a polymerized substance having stickiness so lower as to be discharged from a tank under head pressure was tried to be received by a basin and packed. However, since a scoop can only scoop up a small amount of substance, a method of receiving by a plastic bag at a discharging port was adopted. As the result, a problem arose that liquid dripping at the discharging port was significant and the sticky polymerized substance adhered on the operator and the outer surface of the bag to cause pollution. Furthermore, a problem also arose that the sticky liquid leaked when a pore is made on the plastic bag.

On the other hand, a polymerized substance mainly composed of methacrylic acid having high stickiness remaining on the bottom of the tank was tried to be packed by a scoop in the tank. However, as a result, cloths of the operator was polluted and the packing operation did not progress smoothly and stopped on the way due to the stickiness of the polymerized substance, accordingly, the polymerized substance could not be removed completely.

The waste liquid containing the packed polymerized substance should be treated carefully so as not to injure the bag in charging this into an incinerator capable of burning a solid substance, and the efficiency of the charging operation lowered extremely. Furthermore, the polymerized substance adhered onto a rubber glove to cause pollution in the packing operation, and this was tried to be wiped by waste cloth, however, complete wiping was impossible.

As described above, the present invention can provide a method which, in the case of removal of a sticky substance or waste liquid containing a sticky substance from a vessel and the like which has been conventionally difficult, makes the removing operation easy, and is capable of performing also the subsequent burning treatment at low cost easily.

The invention claimed is:

1. A method of removing a sticky substance or a waste liquid containing a sticky substance which comprises:
   mixing a solid substance having inflammability and liquid-absorptivity into a sticky substance or a waste liquid containing a sticky substance wherein these are mixed to allow a liquid component of the sticky substance or the waste liquid containing the sticky substance to be absorbed into the solid substance and to allow the sticky substance to be entangled with the solid substance,
   wherein the sticky substance or waste liquid containing the sticky substance is a partially polymerized substance or waste liquid containing a partially polymerized substance generated in a process of production, distillation, purification or storage of an easily-polymerizable substance,
   and then removing the sticky substance together with the solid substance or the waste liquid containing the sticky substance together with the solid substance.

2. The method according to claim 1, wherein the liquid component of the sticky substance or the waste liquid containing the sticky substance to be absorbed into the solid substance are mixed with the solid substance to allow the sticky substance to be entangled with the solid substance, and as a result, stickiness of the mixture is lowered so that the mixture can be handled like a solid.

3. The method according to claim 1, wherein the sticky substance is a partially polymerized substance or the waste liquid containing the sticky substance is a waste liquid containing a partially polymerized substance discharged from an equipment for producing methyl methacrylate or methacrylic acid, or both.

4. The method according to claim 1, wherein the sticky substance or the waste liquid containing the sticky substance is a by-product in a reaction process of a petrochemical process.

5. The method according to claim 1, wherein the solid substance having inflammability and liquid-absorptivity is in the form of a particle, flake, fiber, powder, chip, string, thread or noodle.

6. The method according to claim 1, wherein the solid substance having inflammability and liquid-absorptivity is a fractured substance made of wood.

7. The method according to claim 1, wherein the solid substance having inflammability and liquid-absorptivity is a cut substance made of paper.

8. The method according to claim 1, which further comprises discharging the waste liquid containing the sticky substance from a first vessel to a second vessel, wherein after discharging said waste liquid, residue is present in said first vessel, and mixing the solid substance having inflammability and liquid-absorptivity with the waste liquid in said second vessel.

9. The method according to claim 2, wherein the mixture which can be handled like a solid is packed in a bag.

10. The method according to claim 8, which comprises mixing the solid substance having inflammability and liquid-absorptivity with said residue in said first vessel.

11. The method according to claim 9, wherein the packed mixture is burnt.

\* \* \* \* \*